United States Patent [19]
Hosomi et al.

[11] Patent Number: 5,717,055
[45] Date of Patent: Feb. 10, 1998

[54] PRODUCTION METHOD OF POLYCARBONATE RESIN PELLETS

[75] Inventors: Tatsuhide Hosomi, Osaka; Toshikazu Umemura, Tokyo; Toshiaki Takata; Yuji Mori, both of Osaka, all of Japan

[73] Assignee: Mitsubishi Gas Chemical Company, LTD., Tokyo, Japan

[21] Appl. No.: 660,573

[22] Filed: Jun. 11, 1996

[30] Foreign Application Priority Data

Jun. 20, 1995 [JP] Japan .................. 7-153114

[51] Int. Cl.$^6$ .................................................. C08G 64/00
[52] U.S. Cl. .................. 528/196; 528/198; 528/199
[58] Field of Search ............................ 528/196, 198, 528/199

[56] References Cited

U.S. PATENT DOCUMENTS 5,405,934  4/1995  Oshino et al. .................. 528/204
5,510,450  4/1996  Sakashita et al. .................. 528/199

*Primary Examiner*—Terressa Mosley
*Attorney, Agent, or Firm*—Sughrue, Mion, Zinn, Macpeak & Seas, PLLC

[57] ABSTRACT

A method of producing polycarbonate resin pellets containing very less residual organic solvent and low molecular weight volatile matters and having a high transparency by melt-kneading a polycarbonate resin powder in an extruder equipped with a screw having a material seal mechanism, and vents, and devolatilizing the residual organic solvent and/or the low molecular weight volatile matters at the vent portion and then extruding the molten resin.

The polycarbonate resin pellets are suitable for optical grade articles and automobile lenses.

21 Claims, No Drawings

PRODUCTION METHOD OF POLYCARBONATE RESIN PELLETS

FIELD OF THE INVENTION

The present invention relates to a production method of polycarbonate resin pellets having excellent heat resistance and color tone, and which generate less gases from a molded product thereof. More specifically, in the production method of the present invention, during the preparation of the pellets of a polycarbonate resin, by melting and kneading a polycarbonate resin powder using a screw having a specific structure which can increase a filling ratio of the resin, an organic solvent and low molecular weight materials remaining in the resin powder are devolatilized and an oxygen gas is purged to improve a hue of the polycarbonate resin pellets. In particular, the method of the present invention is useful as a method of producing a light-colored and transparent polycarbonate resin suitable for optical articles, parts for automobiles, etc.

BACKGROUND OF THE INVENTION

A polycarbonate resin has been used in wide fields due to its excellent transparency, mechanical properties, flame retardance, dimensional stability, and electric characteristics. However, the polycarbonate resin has the undesirable property that when forming pellets or sheets thereof by extruding, the pellets or sheets are colored in yellow to spoil an external appearance of the products.

The greater part of the polycarbonate resin powder as the raw material is produced at present by an interfacial polymerization method using an organic solvent. Thus, the polycarbonate resin powder produced contains residual organic solvent and low molecular weight materials, whereby the pellets obtained by melt-extruding the polycarbonate resin powder have the residual organic solvent and low molecular weight volatile matters. When moldings are prepared using the pellets, bubbles and low molecular weight volatile matters generate in the moldings.

In particular, when substrates for optical disks are produced by molding these pellets, there are problems that a stamper is stained with such low molecular weight volatile matters, whereby the productivity is greatly reduced for the maintenance and the transferring property of pits is lowered. The low molecular weight volatile matters are oligomers formed by the reaction of raw material monomers and a terminator, monomeric oligomers, a dimer of the terminator, etc., and it is known that in these low molecular weight volatile matters, the most troublesome component having the highest content in the polymer is the monomeric oligomer.

A polycarbonate resin is generally produced mainly by an interfacial polymerization at present. In the interfacial polymerization method, the polycarbonate resin is obtained an organic solvent solution, and thus, as a method of obtaining the polycarbonate resin as a solid product by isolating the resin, there have hitherto been provided many method such as a method wherein the organic solvent solution of the polymer is dropped into warm water with stirring to evaporate the organic solvent, a method wherein the organic solvent solution of the polymer is introduced into a jacket-heating-type paddle-type kneading machine to perform granulation and drying, etc.

However, in the above-described conventional methods, since the organic solvent such as, typically, methylene chloride has a high affinity with polycarbonate, the removal of the organic solvent by a general dryer is difficult and a large-sized dryer is required for removing the organic solvent. For solving such a problem, various methods have been proposed. That is, there are drying methods of using a paddle-type dryer having a normally sending spiral blade group and a reversely sending spiral blade group as described in JP-B-53-15899, JP-B-55-33966 (the term "JP-B" as used herein means an "examined published Japanese patent application"), and JP-A-53-137298 (the term "JP-A" as used herein means an "unexamined published Japanese patent application"). However, when such a horizontal-type dryer is used, the fluidity of a powder in the dryer becomes nonuniform. This results in the generation of burned dusts by super heating and the generation of dusts by the forcible contact of the paddle blades and the powder.

As other method for solving the above-described problem, there is a method wherein the filtration and drying of the polycarbonate solid particles are performed in the same dryer using the filtration dryer as disclosed in JP-A-61-250025. However, when using the dryer, since a long drying time is required and also only a batch treatment can be practiced due to the structure of the dryer, the method cannot be applied to a continuous production.

Hitherto, various methods for reducing the amount of the residual organic solvent at extrusion and for improving the hue of pellets are proposed. For example, there are disclosed a method wherein before and/or during kneading a polycarbonate resin powder, from 0.2 to 20 parts by weight of water is added to 100 parts by weight of the polycarbonate resin, and the resulting polycarbonate resin powder is extruded while degassing under the condition of not causing hydrolysis as described in JP-B-5-27647, and a method of adding water under pressure to a polycarbonate resin powder in an amount of from 0.1 to 5 parts by weight per 100 parts by weight of the polycarbonate resin at the position between the compressively melting portion and the vent outlet farthest from the compressively melting portion at melt-extruding as described in JP-B-7-2364. However, even when the conventional method as described above is used, since the contact of water added and the molten resin and the degree of kneading them are insufficient, the effect of reducing the residual solvent in the pellets formed is less.

There is also proposed a method of forming the pellets of a polycarbonate resin powder after adding phosphorous acid to the polycarbonate resin together with water to control the water content to from 500 to 5,000 ppm as described in JP-A-4-81457. However, in the method, by the addition of phosphorous acid, the hydrolysis resistance is lowered and also the long reliability of optical disks formed by the pellets is lowered.

From the results of conventional investigations, it has been confirmed that the residual organic solvent and low molecular weight volatile matters can be removed to some extent in forming pellets of a polycarbonate resin by extrusion, and for further increasing the removal ratio of them, a method of adding water to a polycarbonate resin powder at extrusion has been used. However, even when such a conventional method is used, the residual solvent and the residual amount of the low molecular weight volatile matters do not reduce to desired levels. It has been found that the reason thereof is that the form of the screw conventionally used is not the form capable of contributing in devolatilization of the residual solvent and low-molecular weight volatile matters, and kneading of water added with the molten resin is insufficient.

SUMMARY OF THE INVENTION

The present inventors have found that a so-called material seal is performed by employing a specific structure of the screw form of an extruder to increase the residence time of the molten resin and the filling ratio of the molten resin the screw portions, whereby the inflow of air from a hopper portion to the vent portion can be prevented to keep a high degree of vacuum, when the residual materials to be removed are devolatilized at the vent portion after kneading the molten resin by increasing the pressure of the molten resin at the seal portion, the devolatilizing effect is improved, and further, when a specific amount of water is added to the portion having the material seal mechanism, the effect is greatly improved.

The present invention relates to a production method of polycarbonate resin pellets capable of greatly reducing the residual organic solvent and low molecular weight volatile matters, improving the hue of the moldings, and generating less gases on molding operation.

An object of the present invention is to provide a method of removing residual solvent and low molecular weight volatile matters while reducing the production cost by reducing the load in the drying step of the resin.

The present inventors have succeeded in solving the problems described above by employing the specific structure of the screw form capable of increasing the residence time of the molten resin in air extruder to perform sufficient kneading, and have achieved the present invention.

That is, the present invention is a method of producing polycarbonate resin pellets, which comprises melt-kneading the polycarbonate resin powder with an extruder equipped with a screw having a material seal mechanism, and vents, the material seal portion having a filling ratio of the molten resin of at least 50% of a space to be filled by resin, devolatilizing residual organic solvent and/or low molecular weight volatile matters at the vent portion, and extruding the molten resin.

In a preferred embodiment of the method of the present invention, the material seal is accomplished with a reverse screw or a dam ring. In another preferred embodiment of the method of the present invention for improving the devolatilization effect, water is added to the portion having the material seal mechanism in an amount of from 0.05 to 5.0 parts by weight per 100 parts by weight of the polycarbonate resin, and the resin and water are kneaded to form the pellets.

DETAILED DESCRIPTION OF THE INVENTION

The present invention is described in detail below.

The polycarbonate resin used in the present invention is produced by reacting a dihydric phenol compound as the main component with phosgene using a small amount of a molecular weight modifier and, if desired, a branching agent by a solution method such as an interfacial polymerization method, a pyridine method, a chloroformate method, etc. Examples of the polycarbonate resin are an aromatic homo- or co-polycarbonate resin produced using an ordinary bisphenol, a branched polycarbonate resin, a polycarbonate resin having a long-chain alkyl group introduced into the terminal thereof, etc., each having a viscosity average molecular weight of from 5,000 to 100,000, preferably from 13,000 to 90,000, and more preferably from 15,000 to 35,000.

The polycarbonate resin used in the present invention further includes a grafted polycarbonate resin obtained by reacting a polycarbonate resin having a carbon-carbon double bond or other graft-polymerizable active point and a polymerizable monomer such as styrene, methacrylic acid, acrylic acid, methacrylate or acrylate.

Examples of the preferred dihydric compound used in the production method of the polycarbonate resin of the present invention are bis(4-hydroxyphenyl)methane, bis(4-hydroxyphenyl) ether, bis(4-hydroxyphenyl)sulfone, bis(4-hydroxyphenyl) sulfoxide, bis(4-hydroxyphenyl) sulfide, bis (4-hydroxyphenyl) ketone, 1,1-bis(4-hydroxyphenyl) ethane, 2,2-bis(4-hydroxyphenyl)propane [bisphenol A; BPA], 2,2-bis(3,5-dibromo-4-hydroxyphenyl)propane 2 [TBA], 2-bis(4-hydroxyphenyl)butane, 1,1-bis(4-hydroxyphenyl)cyclohexane [bisphenol Z; BPZ], 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl) diphenylmethane, α,ω-bis[3-(o-hydroxyphenyl)propyl] polydimethylsiloxane [PDS], and biphenol. These compounds may be used alone or as a combination of them. In these compounds, bisphenol A, bisphenol Z, TBA, or PDS is preferably used.

The terminator or the molecular weight modifier is compounds having a monohydric phenolic hydroxy group. Examples thereof are usually phenol, p-tertiary butylphenol, tribromophenol, etc., and also include long-chain alkylphenols, aliphatic carboxylic acid chloride, aliphatic carboxylic acids, aromatic carboxylic acids, aromatic acid chlorides, hydroxybenzoic acid alkyl esters, and alkyl ether phenols.

Also, a compound having a reactive double bond can be used as the terminator. Examples of the compound are unsaturated carboxylic acids such as acrylic acid, vinylacetic acid, 2-pentenoic acid, 3-pentenoic acid, 5-hexenoic acid, 9-undecenoic acid, etc.; acid chlorides or chloroformates such as acrylic acid chloride, sorbic acid chloride, allyl alcohol chloroformate, isopropenylphenol chloroformate, hydroxystyrene chloroformate, etc.; and phenols having an unsaturated group such as isopropenylphenol, hydroxystyrene, hydroxyphenylmaleimide, hydroxybenzoic acid allyl ester, hydroxybenzoic acid methyl allyl ester, etc. Each of these compounds may be used together with an ordinary compound having a monohydric phenolic hydroxy group.

The terminator or the molecular weight modifier is used in an amount of from 1 to 25 mol %, and preferably from 1.5 to 10 mol % per mole of the dihydric phenolic compound.

The reaction solvent used for the reaction in the present invention is a solvent which is inactive to the reaction. Examples of the solvent are chlorinated hydrocarbons such as dichloromethane, 1,2-dichloroethane, 1,1,2,2-tetrachloroethane, chloroform, 1,1,1-trichloroethane, carbon tetrachloride, monochlorobenzene, dichlorobenzene, etc.; aromatic hydrocarbons such as benzene, toluene, xylene, ethylbenzene, etc.; and ether series compounds such as diethyl ether, etc. These organic solvent can be used alone or as a mixture of them. Also, if desired, other solvents such as ethers, ketones, esters, nitriles, etc., can be used in the compatible range with water.

A branching agent can be used in the present invention. The branching agent can be used in the amount of from 0.01 to 3.0 mol %, and preferably from 0.1 to 1.0 mol %, per mole of the dihydric phenolic compound, thereby forming a branched polycarbonate resin. Examples of the branching agent are polyhydroxy compounds such as phloroglucin, 2,6-dimethyl-2,4,6-tri(4-hydroxyphenyl)heptene-3, 4,6-dimethyl-2,4,6-tri(4-hydroxyphenyl)heptene-2, 1,3,5-tri(2- hydroxyphenyl)benzol, 1,1,1-tri(4-hydroxyphenyl)ethane, 2,6-bis(2-hydroxy-5-methylbenzyl)-4-methylphenol, $\alpha,\alpha'$, $\alpha''$-tri(4-hydroxyphenyl)-1,3,5-triisopropylbenzene, etc., 3,3-bis(4-hydroxyphenyl)oxyindole [=isatinbisphenol], 5-chloroisatinbisphenol, 5,7-dichloroisatinbisphenol, and 5-bromoisatinbisphenol.

The polycarbonate resin used in the present invention is, in particular, a polycarbonate produced using bisphenol A as the main raw material. A polycarbonate copolymer obtained: using bisphenol A together with bisphenol Z, tetrabromobisphenol A (TBA), etc., the branched product of the polycarbonate copolymer, and the terminal long chain alkyl-modified polycarbonate copolymer are preferred.

The polycarbonate resin powder used in the present invention is a powder obtained by solidifying the polycarbonate resin from a purified polycarbonate resin solution. Methods of forming the powder include various methods such as a method of concentrating the polycarbonate resin solution by distilling off the solvent to form granules thereof, a method wherein a poor solvent is added to the polycarbonate resin solution, the resin solution is suspended in warm water to distill off the solvent and the poor solvent to form an aqueous slurry liquid thereof, and the granules are then separated from the aqueous slurry liquid. In the present invention, the polycarbonate resin powder obtained by any method can be used. The powder thus obtained generally contains from 0.01 to 10% by weight of residual water and from 0.01 to 4% by weight of residual solvent although the contents of them differ according to the application or no application of drying, the kind of a dryer, and the drying condition.

In the present invention, the polycarbonate resin pellets are produced by melt-kneading the polycarbonate resin powder with an extruder equipped with a screw having a material seal mechanism, and vents. Examples of the extruder include a single screw extruder and multiscrew extruder with single-stage: or multi-stage vents. In these extruders, a twin-screw extruder having two or more vents is preferable.

The material seal mechanism means the mechanism that by using a screw element having a specific structure, the moving speed of the resin in the inside of the cylinder is regulated, the filling ratio of the molten resin at that portion is increased, the occurrence of the backflow of the devolatilized residual solvent and low molecular weight volatile matters is prevented, the molten resin moves to a next portion in a cylinder, the filling ratio of the molten resin is decreased, and generated gases are flashed,.whereby the residual solvent and low molecular weight volatile matters are degassed immediately at the vent portion(s). One extruder can have therein one or more material seal mechanisms.

Furthermore, a vent for accelerating degassing is formed at the die-side (outlet side) from the material seal portion and for reducing the residual amounts of the residual solvent and low molecular weight volatile matters, the degree of vacuum of the vent is preferably below 60 torr. It is more preferred to lower the degree of vacuum below 30 torr by using a mechanical booster.

The polycarbonate resin powder as the raw material is supplied to the inside of the cylinder of the extruder directly through a hopper or by a side feeder. The resin powder is melted by heating the cylinder. Since usually screw threads are formed in the normal direction in the screw, the molten: resin moves to the outlet direction by the rotation of the screw and is introduced to the material seal portion. In the material seal portion, since the screw threads are not normal direction screw threads but according to the structure, the screw threads are formed in the reverse direction or a dam ring, etc., is formed, that is, the material seal portion has a structure of obstructing the flow of the molten resin, the filling ratio of the molten resin at the portion is greatly increased. In the material seal portion, the temperature is increased by heating from the barrel or shearing heat generation by the friction of the resins each other and of the resin and the barrel, thereby the volatilization of the residual solvent and low molecular weight volatile matters is accelerated. Since the filling ratio of the molten resin and the pressure are high at the portion, backflow of the devolatilized gaseous materials can be prevented. The filling ratio of the molten resin is at least 50% of a space to be filled by resin in the material seal portion. If the filling ratio of the molten resin is less than 50%, a sealing effect becomes insufficient and a backflow of the gaseous materials cannot be prevented, and as a result, the degassing effect is reduced. Then, the molten resin moves to the vent portion. In the material seal portion, the molten resin is compressed, but the pressure of the molten resin passed through the material seal portion is released and by the vacuum degree at the vent portion, the devolatilization of the residual solvent and low molecular weight volatile matters is abruptly accelerated.

In the present invention, for accelerating the devolatilization of the residual solvent and low molecular weight volatile matters, water can be added to the raw material powder or to the portion in the molten state. It is particularly preferred to use a method of adding water to the portion having the material seal portion in an amount of from 0.05 to 5.0 parts by weight per 100 parts by weight of the polycarbonate. That is, the added water is abruptly gasified and tends to backflow to the inlet of the resin powder, but by the material seal mechanism, the gasified water does not backflow, whereby the occurrence of the backflow phenomenon of the resin powder can be prevented. Furthermore, the kneading degree of the gasified water and the molten resin is increased by the high filling ratio of the molten resin, whereby the devolatilization of the residual solvent and low molecular weight volatile matters can be more accelerated.

As the adding position of water, water is added to the portion having the material seal mechanism, and practically, it is preferred that water is added to the portion where the filling ratio of the molten resin is increased by the dam ring or the reverse screw, or immediately after the portion. When water is added to the hopper side rather than the dam ring and the reverse screw, the trouble of supplying the resin powder occurs by backflow of the gasified water, and kneading of the gasified water and the molten resin cannot be carried out well. When water is added to a portion behind the portion having the material seal mechanism, the gasified water undesirably gets away through the vent without sufficiently contacting with the molten resin.

The kneading time of water and the molten resin is preferred such that the gasified water is kneaded with the molten resin for from several seconds to several tens of seconds, practically from 2 to 30 seconds. If the kneading time is shorter than 2 seconds, kneading of the molten resin and water becomes insufficient, and the effect of adding water is not sufficiently obtained, while if the kneading time is over 30 seconds, the hydrolysis of the polymer by steam occurs, resulting in coloration.

The kneading time of the gasified water and the molten resin is determined by the distance of from the position to which water is added to the vent, the emerging amount of the resin, and the rotation rate of the screw, and by changing these conditions, the kneading time can be controlled. Practically, an average residence time (T) of moving the resin through a screw length (L) is determined by carrying out a tracer response test per each emerged amount of the resin and each rotation rate of the screw, and when the distance of from the adding position of water to the vent is d, the kneading time (t) of water and molten resin can be approximated using the calculation formula, t=Td/L.

Water added in the present invention is preferably pure water, and pure water having an electric conductivity of not higher than 5 µS/cm, and preferably not higher than 1 µS/cm is used. Water usually contains inorganic salts and if even slight amounts of these salts exist in water, there is a possibility that the vapor resistance and the heat resistance of the moldings are lowered. Hence it is necessary to lower the electric conductivity of water as low as possible.

In melt-extruding the polycarbonate resin powder in the present invention, additives for modifying the polycarbonate resin may be added. For example, flame retardants, light stabilizers, antistatic agents, plasticizers, lubricants, compatibilizers, foaming agents, reinforcing agents (such as glass fibers, carbon fibers, ceramic whiskers, etc.), fillers, dyes, pigments, and other resins than polycarbonate, such as polyethylene, polypropylene, polyethylene tetrafluoride, poly-vinylidene fluoride, polystyrene, polymethyl methacrylate, an ABS resin, polyester, polyphenylene oxide, etc., and elastomers can be mixed with the polycarbonate resin powder.

The invention is explained in more detail by the following examples, but the invention is not limited to those.

Reference Example (Production method of typical polycarbonate powder)

A methylene chloride solution of a polycarbonate resin produced using bisphenol A was purified to obtain a polycarbonate resin solution having a resin concentration of 20% and a viscosity average molecular weight of $2.1 \times 10^4$. After adding to 200 liters of the resin solution under stirring 40 liters of n-heptane followed by uniformly mixing, while adding dropwise the mixed solution to warm water with stirring over a period of 10 minutes, the resin was ground by a wet grinder. During dropping the solution, the temperature of the liquid in a vessel was kept at 40° C. and the inside pressure was kept below 0.1 kg/cm²(G). After completion of the addition of the solution, the temperature in the vessel was raised to about 100° C., the solvent was distilled off for about 15 minutes, and the aqueous slurry of the polycarbonate resin obtained was taken out, filtered and squeezed to obtain a wet resin powder. The wet resin powder was dried using a hot blast circulating dryer at 140° C. over a period of 4 hours to obtain a dry resin powder having residual organic solvent amounts that n-heptane was 4,530 ppm and methylene chloride was 11 ppm, and having a monomeric oligomer content of 0.94%.

Measurement Method of Residual Solvent Amount in Pellet:

1 g of the polycarbonate resin pellets was dissolved in dioxane to obtain 20 ml of a solution. A quantitative analysis was carried out by a gas chromatograph.

Monomeric Oligomer Content in Pellet

In 20 ml of chloroform was dissolved 100 mg of the polycarbonate resin pellets, the measurement was carried out using GPC manufactured by Waters Co. (column: Shodex K803L×2, detector: 490 UV detector, 254 nm, and AUFS 1.0) at a sample amount of 100 µl and a solvent flow rate of 1.0 ml/minute, and from the peak area near the retention time of 19.25 minutes, the content (%) of the monomeric oligomer in the pellet was obtained.

Hue Evaluation Method

Pellets of the polycarbonate resin were molded by an injection molding machine (Neomat 350/120, manufactured by Sumitomo Heavy Industries, Ltd.) at a resin temperature of 320° C., a die temperature of 80° C., and a retention pressure of 1,000 kg/cm² to continuously form 5 molded plates each having an area of 50 mm×60 mm and a thickness of 3 mm, and by measuring the color of the molded plates with a color-difference meter manufactured by Nippon Denshoku K. K., the YI value (the index of showing yellowish color) was obtained.

Measurement Method of Filling Ratio

The filling ratio (f) in the present invention is determined by the following equation, assuming that the specific gravity of a polycarbonate resin is 1.19.

$$f=(E \times t)/(V \times 1.19)$$

wherein

V: Space volume of the portion of screw channels at the material seal portion

E: Emerged amount of resin t: Residence time as described before

EXAMPLES 1 TO 5

A polycarbonate resin powder having an n-heptane content of 4,530 ppm and a methylene chloride content of 11 ppm was used as the raw material powder, a twin screw extruder manufactured by Hermann Bersteff maschinenbau GMBH (screw diameter: 40 mm, V=50 cm³, L/D=32, L:total screw length, D:screw diameter) was used as an extruder, a double-thread screw was used as the screw form except that the screw had a dam ring at the 16D portion from the tip thereof, a barrel having a vent (vacuum degree: 40 torr) at the 14D portion from the tip thereof was used, and extrusion was carried out at the emerged amount of 20 kg/hour (Example 1), 30 kg/hour (Example 2), 40 kg/hour (Example 3), 50 kg/hour (Example 4), and 70 kg/hour (Example 5) and at a screw rotation rate of 250 r.p.m.

The residual solvent concentrations and the monomeric oligomer contents in the pellets and YI values of the molded plates were measured. The results obtained are shown in Table 1 below.

COMPARATIVE EXAMPLES 1 TO 3

By following the same procedure as in Examples 1 to 5 above except that the screw having no dam ring was used, pellets were molded at a screw rotation rate of 250 r.p.m. and the emerged amount of 30 kg/hours (Comparative Example 1), 50 kg/hour (Comparative Example 2), and 70 kg/hour (Comparative Example 3). The residual solvent concentrations and the residual monomeric oligomer contents in the pellets and the hue (YI value) after molding the plates were measured. The results obtained are shown in Table 1 below.

TABLE 1

| | Emerged Amount (kg/h) | Screw Rotation Rate (rpm) | Filling Ratio (%) | Plate Hue (YI Value) | Residual Solvent (ppm) | Monomer Content (%) |
|---|---|---|---|---|---|---|
| Example 1 | 20 | 250 | 53 | 1.33 | 24 | 0.16 |
| Example 2 | 30 | 250 | 62 | 1.25 | 25 | 0.17 |
| Example 3 | 40 | 250 | 70 | 1.22 | 25 | 0.17 |
| Example 4 | 50 | 250 | 81 | 1.21 | 26 | 0.18 |
| Example 5 | 70 | 250 | 95 | 1.24 | 26 | 0.18 |
| Comparative Example 1 | 30 | 250 | 23 | 2.21 | 130 | 0.66 |
| Comparative Example 2 | 50 | 250 | 35 | 2.12 | 234 | 0.69 |
| Comparative Example 3 | 70 | 250 | 43 | 2.15 | 318 | 0.75 |

EXAMPLES 6 TO 8

A polycarbonate resin powder having an n-heptane content of 18,030 ppm and a methylene chloride content of 1,050 ppm was used as the raw material powder, the extruder as used in Examples 1 to 5 described above was used, a double-thread screw except that the screw had a dam ring at the 16D portion from the tip thereof was used as a screw form, a barrel (vacuum degree of 40 torr) having a vent at the 12D portion from the tip thereof was used, and while adding pure water to the polycarbonate resin powder in an amount of 1 part by weight per 100 parts by weight of the polycarbonate resin, the extrusion was carried out at the emerged amount of 30 kg/hour (Example 6), 50 kg/hour (Example 7), and 70 kg/hour (Example 8) and a screw rotation rate of 300 r.p.m.

The residual solvent concentration and the monomeric oligomer content in the extruded pellets and the YI values of the molded plates were measured. The results obtained are shown in Table 2 below.

COMPARATIVE EXAMPLES 4 AND 5

By following the same procedures as in Examples 6 and 8, respectively, except that a double-thread screw having no damp ring was used, pellets were formed by extrusion. The residual solvent concentration and monomeric oligomer content in the pellets and the hue after molding plates were measured. The results obtained are shown in Table 2 below.

the monomeric oligomer content in the pellets and the hue after molding the plates were measured. The results obtained are shown in Table 3 below.

EXAMPLE 12

By following the same procedure as in Example 7 except that the amount of pure water added was changed to 2.7 parts by weight, the pellets of the polycarbonate resin were formed by extrusion. The residual solvent concentration and the monomeric oligomer content in the pellets and the hue after molding the plates were measured. The results obtained are shown in Table 3 below.

EXAMPLE 13

By following the same procedure as in Example 7 except that the amount of pure water added was changed to 5 parts by weight, the pellets of the polycarbonate resin were formed by extrusion. The residual solvent concentration and the monomeric oligomer content in the pellets and the hue after molding the plates were measured. The results obtained are shown in Table 3 below.

COMPARATIVE EXAMPLE 6

By following the same procedure as in Example 12 except that the double-thread screw having no dam ring was used, the pellets of the polycarbonate resin were formed by extrusion. The residual solvent concentration and the mono-

TABLE 2

| | Emerged Amount (kg/h) | Screw Rotation Rate (rpm) | Filling Rate (%) | Plate Hue (YI Value) | Residual Solvent (ppm) | Monomer Content (%) |
|---|---|---|---|---|---|---|
| Example 6 | 30 | 300 | 60 | 1.13 | 35 | 0.14 |
| Example 7 | 50 | 300 | 79 | 1.15 | 37 | 0.14 |
| Example 8 | 70 | 300 | 92 | 1.21 | 41 | 0.15 |
| Comparative Example 4 | 30 | 300 | 20 | 2.15 | 430 | 0.66 |
| Comparative Example 5 | 70 | 300 | 40 | 2.29 | 550 | 0.75 |

EXAMPLES 9 TO 11

By following the same procedure as in Examples 6 to 8, respectively, except that a reverse screw was used in place of the dam ring, pellets of the polycarbonate resin were formed by extrusion. The residual solvent concentration and meric oligomer content in the pellets and the hue after molding the plate were measured. The results obtained are shown in Table 3 below.

COMPARATIVE EXAMPLE 7

By following the same procedure as in Example 13 except that the double-thread screw having no dam ring was used, the pellets of the polycarbonate resin were formed by extrusion. The residual solvent concentration and the monomeric oligomer content in the pellets and the hue after molding the plates were measured. The results obtained are shown in Table 3 below.

per 100 parts by weight of the polycarbonate resin, the extrusion was carried out. The results obtained are shown in Table 3 below.

TABLE 3

|  | Emerged Amount (kg/h) | Screw Rotation Rate (rpm) | Filling Ratio (%) | Plate Hue (YI Value) | Residual Solvent (ppm) | Monomer Content (%) |
| --- | --- | --- | --- | --- | --- | --- |
| Example 9 | 30 | 300 | 60 | 1.21 | 23 | 0.13 |
| Example 10 | 50 | 300 | 80 | 1.14 | 34 | 0.15 |
| Example 11 | 70 | 300 | 92 | 1.16 | 40 | 0.14 |
| Example 12 | 50 | 300 | 80 | 1.08 | 12 | 0.16 |
| Example 13 | 50 | 300 | 79 | 1.07 | 10 | 0.15 |
| Example 14 | 50 | 200 | 95 | 1.20 | ND | 0.13 |
| Example 15 | 50 | 200 | 95 | 1.16 | ND | 0.13 |
| Example 16 | 50 | 200 | 94 | 1.13 | ND | 0.13 |
| Comparative Example 6 | 50 | 300 | 32 | 2.33 | 320 | 0.86 |
| Comparative Example 7 | 50 | 300 | 30 | 2.42 | 230 | 0.88 |
| Comparative Example 8 | 50 | 200 | 95 | 2.88 | ND | 0.15 |

ND: No detection

EXAMPLE 14

A polycarbonate resin powder having an n-heptane content of 3% and a methylene chloride content of 4,500 ppm was used as a raw material powder, the extruder used in Examples 1 to 5 was used, a double-thread screw except that the screw had dam rings at the 16D portion and the 24D portion from the tip thereof was used as a screw form, and a barrel (vacuum degree of 40 torr) having vents at the 12D portion and the 20D portion from the tip thereof was used. While adding pure water to the 16D portion and the 24D portion of the screw from the tip thereof in each amount of 1 part by weight per 100 parts by wight of the polycarbonate resin, the extrusion was carried out at the emerged amount of 50 kg/hour and at a screw rotation rate of 200 r.p.m. to form pellets. The residual solvent concentration and the monomeric oligomer content in the extruded pellets and the YI value of the molded plates were measured. The results obtained are shown in Table 3 below.

EXAMPLE 15

By following the same procedure as in Example 14 except that the amount of pure water added was changed to 1.5 parts by weight per 100 parts by weight of the polycarbonate resin, the extrusion was carried out. The results obtained are shown in Table 3 below.

EXAMPLE 16

By following the same procedure as in Example 14 except that the amount of pure water added was changed to 2.5 parts by weight per 100 parts by weight of the polycarbonate resin, the extrusion was carried out. The results obtained are shown in Table 3 below.

COMPARATIVE EXAMPLE 8

By following the same procedure as in Example 14 except that the amount of pure water added to 16D and 24D portions was changed in each amount of 3 parts by weight per 100 parts by weight of the polycarbonate resin, the extrusion was carried out. The results obtained are shown in Table 3 below.

As described above, in the method of the present invention, by carrying out the extrusion using a screw having a material seal mechanism, it becomes possible to reduce the residual solvent amount and low molecular weight volatile matters in the pellets formed, and prevent the generation of bubbles at molding and staining of stumper. Further, since the polycarbonate pellets by the method of the present invention have a good color tone and a high transparency, the method of the present invention is suitable for the production method of low-dust particle transparent materials of optical grades, lenses, parts for automobiles, etc.

While the invention has been described in detail and with reference to specific embodiments thereof, it will be apparent to one skilled in the art that various changes and modifications can be made therein without departing from the spirit and scope thereof.

What is claimed is:

1. A method for producing polycarbonate resin pellets, said method comprising the steps of (i) introducing polycarbonate resin powder into an extruder comprising a die, (ii) converting said powder into molten polycarbonate and (iii) passing said molten polycarbonate through said die, wherein said extruder further comprises a material seal portion, a vent portion and a screw equipped with a material seal mechanism, said vent portion having vents, wherein said powder is introduced into said extruder, said powder being converted by melt-kneading into molten resin in said extruder, said molten resin being passed through said material seal portion into said vent portion, and said molten resin being passed out of said vent portion through said die, wherein said material seal mechanism restricts the flow of molten resin, wherein the filling ratio of molten resin in said material seal portion is greater than 50% of the space capable of being filled by molten resin, and wherein residual organic solvent and/or other low molecular weight volatile matter is devolatized in said vent portion and passed through said vents.

2. The method of producing polycarbonate resin pellets as claimed in claim 1, wherein the material seal mechanism is a screw structure having a reverse screw or a dam ring.

3. The method of producing polycarbonate resin pellets as claimed in claim 1, wherein water is added to the molten resin in an amount of from 0.05 to 5.0 parts by weight per 100 parts by weight of polycarbonate resin.

4. The method of producing polycarbonate resin pellets as claimed in claim 1, 2 or 3, wherein the polycarbonate resin is an aromatic polycarbonate resin obtained by reacting a dihydric phenol compound and phosgene using a small amount of a molecular weight modifier in the presence of a solvent, and has a viscosity average molecular weight of from 5,000 to 100,000.

5. The method of producing polycarbonate resin pellets as claimed in claim 1, 2 or 3, wherein a vacuum of 60 torr or less is maintained in said vent portion.

6. The method of producing polycarbonate resin pellets as claimed in claim 3, wherein the kneading time of water and the molten resin is from 2 to 30 seconds.

7. The method of producing polycarbonate resin pellets as claimed in claim 1, wherein said polycarbonate resin powder is added to said extruder through a hopper into a first portion of said extruder before said material seal portion, wherein water is added to the molten resin in said material seal portion, and wherein water is added to the molten resin in an amount of from 0.05 to 5.0 parts by weight per 100 parts by weight of polycarbonate resin.

8. The method of producing polycarbonate resin pellets as claimed in claim 1, wherein said powder contains from 0.01 to 10% by weight of residual water and from 0.01 to 4% by weight of residual solvent.

9. The method of producing polycarbonate resin pellets as claimed in claim 1, wherein a vacuum of 30 torr or less is maintained in said vent portion.

10. The method of producing polycarbonate resin pellets as claimed in claim 1, wherein said polycarbonate resin powder is obtained by a solution method.

11. The method of producing polycarbonate resin pellets as claimed in claim 1, wherein said polycarbonate resin powder is obtained by an interfacial polymerization method.

12. The method of producing polycarbonate resin pellets as claimed in claim 10, wherein said polycarbonate resin powder is produced by reacting a dihydric phenol compound as the main component with phosgene using a small amount of a molecular weight modifier.

13. The method of producing polycarbonate resin pellets as claimed in claim 10, wherein said polycarbonate resin powder is produced by reacting a dihydric phenol compound as the main component with phosgene using a small amount of a molecular weight modifier and a branching agent.

14. The method of producing polycarbonate resin pellets as claimed in claim 13, wherein said molecular weight modifier is used in an amount of from 1 to 25 mol % per mole of the dihydric phenolic compound.

15. The method of producing polycarbonate resin pellets as claimed in claim 14, wherein said molecular weight modifier is selected from the group consisting of phenol, p-tertiary butylphenol and tribromophenol.

16. The method of producing polycarbonate resin pellets as claimed in claim 14, wherein said molecular weight modifier is selected from the group consisting of long-chain alkylphenols, aliphatic carboxylic acids, aromatic carboxylic acids, aromatic acid chlorides, hydroxybenzoic acid alkyl esters and alkyl ether phenols.

17. The method of producing polycarbonate resin pellets as claimed in claim 14, wherein said molecular weight modifier is a compound having a reactive double bond.

18. The method of producing polycarbonate resin pellets as claimed in claim 15, wherein said branching agent is used in an amount of from 0.1 to 3.0 mol % per mole of the dihydric phenolic compound.

19. The method of producing polycarbonate resin pellets as claimed in claim 18, wherein said branching agent is selected from the group consisting of phloroglucin, 2,6-dimethyl-2,4,6-tri(4-hydroxyphenyl)heptene-3, 4,6-dimethyl-2,4,6-tri(4-hydroxyphenyl)heptene-2, 1,3,5-tri(2-hydroxyphenyl)-benzol, 1,1,1-tri(4-hydroxyphenyl)ethane, 2,6-bis(2-hydroxy-5-methylbenzyl)-4-methylphenol, alpha, alpha',alpha"-tri(4-hydroxyphenyl)-1,3,5-triisopropylbenzene, 3,3-bis(4-hydroxyphenyl)-oxyindol, 5-chloroisatinbisphenol, 5,7-dichloroisatinbisphenol, and 5-bromoisatinbisphenol.

20. The method of producing polycarbonate resin pellets as claimed in claim 1, wherein said polycarbonate resin powder includes a grafted polycarbonate resin.

21. The method of producing polycarbonate resin pellets as claimed in claim 20, wherein said grafted polycarbonate resin is obtained by reacting a polycarbonate resin having a carbon-carbon double bond with a polymerizable monomer selected from the group consisting of styrene, methacrylic acid, acrylic acid, methacrylate and acrylate.

* * * * *